(12) United States Patent  
Bala

(10) Patent No.: US 12,190,018 B2
(45) Date of Patent: Jan. 7, 2025

(54) SYSTEM AND METHOD FOR GENERATING, TRIGGERING, AND PLAYING AUDIO CUES IN REAL TIME USING A PERSONAL AUDIO DEVICE

(71) Applicant: Arjun Karthik Bala, Bengaluru (IN)

(72) Inventor: Arjun Karthik Bala, Bengaluru (IN)

( * ) Notice: Subject to any disclaimer, the term of this patent is extended or adjusted under 35 U.S.C. 154(b) by 272 days.

(21) Appl. No.: 17/789,492

(22) PCT Filed: Jan. 4, 2021

(86) PCT No.: PCT/IN2021/050009
§ 371 (c)(1),
(2) Date: Jun. 27, 2022

(87) PCT Pub. No.: WO2021/137258
PCT Pub. Date: Jul. 8, 2021

(65) Prior Publication Data
US 2023/0044079 A1   Feb. 9, 2023

(30) Foreign Application Priority Data

Jan. 4, 2020   (IN) .............................. 202041000363

(51) Int. Cl.
*G06F 3/16* (2006.01)
*G06T 7/20* (2017.01)
(Continued)

(52) U.S. Cl.
CPC ................ *G06F 3/167* (2013.01); *G06T 7/20* (2013.01); *G06V 40/20* (2022.01); *G10L 25/78* (2013.01)

(58) Field of Classification Search
CPC ...... G06F 3/167; G06F 16/685; G06F 40/216; G06F 40/279; G06F 40/35; G06F 40/131;
(Continued)

(56) References Cited

U.S. PATENT DOCUMENTS

2009/0254345 A1* 10/2009 Fleizach ................. G10L 13/00
704/260
2014/0067936 A1* 3/2014 Seligmann .......... H04L 12/1818
709/204

(Continued)

OTHER PUBLICATIONS

Chen et al. "Intelligent Agents Meet the Semantic Web in Smart Spaces", Dec. 2004, IEEE Computer Society, pp. 69-79 (Year: 2004).*

*Primary Examiner* — Bhavesh M Mehta
*Assistant Examiner* — Darioush Agahi

(57) ABSTRACT

A system and method for generating, triggering and playing a sequence of audio files with cues for delivering a presentation for a presenter using a personal audio device coupled to a computing device. The system comprising the comprising a computer device that is coupled to a presentation data analysis server through a network. The method includes (i) generating a sequence of audio files with cues for delivering a presentation, (ii) triggering playing an audio file from the sequence of audio files, and (iii) playing the sequence of audio files one by one, on the computing device, using the personal audio device coupled to a computing device to enable the presenter to recall and speak the content based on the sequence of the audio files.

14 Claims, 11 Drawing Sheets

(51) Int. Cl.
 *G06V 40/20* (2022.01)
 *G10L 25/78* (2013.01)
(58) Field of Classification Search
 CPC ........... G06T 7/20; G06V 40/20; G10L 25/78; G10L 13/00; G10L 15/26
 See application file for complete search history.

(56) References Cited

U.S. PATENT DOCUMENTS

| | | | |
|---|---|---|---|
| 2015/0206544 A1* | 7/2015 | Carter | G10L 15/04 704/235 |
| 2018/0088672 A1* | 3/2018 | Schantz | G06F 3/167 |
| 2019/0155568 A1* | 5/2019 | Sears | G06F 3/167 |
| 2020/0174745 A1* | 6/2020 | Jung | G06F 3/04812 |
| 2020/0201598 A1* | 6/2020 | Topaloglu | G10L 15/07 |
| 2021/0065684 A1* | 3/2021 | Ding | G10L 15/02 |

\* cited by examiner

GENERATING A SEQUENCE OF AUDIO FILES WITH CUES FOR DELIVERING A PRESENTATION BY AT LEAST ONE OF (I) SELECTING TEXT FROM A FILE THAT INCLUDES CONTENT FOR THE PRESENTATION OR TYPING THE TEXT THAT INCLUDES A CUE WORD OR PHRASE, AND AUTOMATICALLY CONVERTING THE TEXT TO SPEECH, USING A TEXT-TO-SPEECH ENGINE IMPLEMENTED BY A PROCESSOR, OR (II) RECORDING THE AUDIO FILES, USING A MICROPHONE COUPLED TO THE COMPUTING DEVICE, BY SPEAKING THE AT LEAST ONE CUE WORD OR PHRASE
702

TRIGGERING PLAYING AN AUDIO FILE FROM THE SEQUENCE OF AUDIO FILES, BY AT LEAST ONE OF (I) PRESSING A BUTTON COUPLED TO THE COMPUTING DEVICE OR THROUGH A TOUCH SCREEN, (II) ANALYSING A LIVE SPEECH BY A PRESENTER AND DETECTING A PAUSE. (III) CONVERTING THE SPEECH TO TEXT, USING AUTOMATIC VOICE RECOGNITION, AND PARSING THE TEXT TO DETECT A CUE WORD OR PATTERN, (IV) DETECTING A SLIDE, A PAGE, OR A CONTENT IN A PRESENTATION FILE, AND DETERMINING AT LEAST ONE CUE THAT CORRESPONDS TO THE SLIDE, THE PAGE, OR THE CONTENT, OR (V) DETECTING A GESTURE MADE BY THE PRESENTER USING A CAMERA AND A GESTURE RECOGNITION ENGINE
706

PLAYING THE SEQUENCE OF AUDIO FILES ONE BY ONE, ON THE COMPUTING DEVICE, USING THE PERSONAL AUDIO OUTPUT DEVICE COUPLED TO A COMPUTING DEVICE TO ENABLE THE PRESENTER TO RECALL AND SPEAK THE CONTENT BASED ON THE SEQUENCE OF THE AUDIO FILES
712

FIG. 7

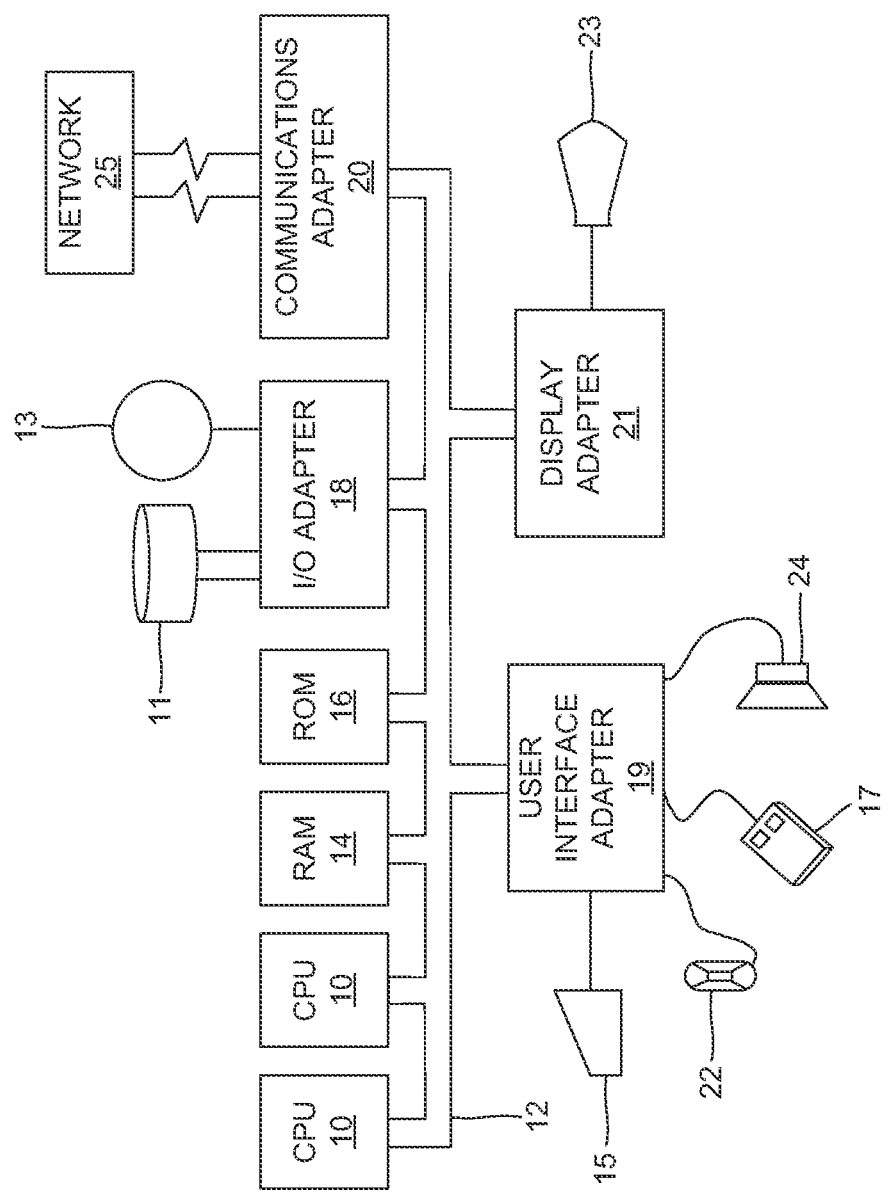

SYSTEM AND METHOD FOR GENERATING, TRIGGERING, AND PLAYING AUDIO CUES IN REAL TIME USING A PERSONAL AUDIO DEVICE

BACKGROUND

Technical Field

The embodiments herein generally relate to voice data processing and playback, more particularly to a system and method for analyzing real time voice data to play audio cues in real time using a personal audio device.

Description of the Related Art

Speaking in front of an audience has been a requirement in recent times for any idea or a project that needs conveying of an information in effective way. Generally, a speaker is on stage facing the audience or a camera, in which case both the content and the mannerism of the speaker leaves an impression on the audience. Sensitivity to the time and attention of the audience is imperative to deliver impactful presentations. The speaker may experience difficulties managing the time-line, delivering the content that they prepared without missing parts of it, and using the right words and gestures at right time, or while responding to questions during interactive session with audience. Usually, the preparation for speaking may require few hours to days for preparing the content and practicing delivery. But the speaker may not have enough time to prepare for the delivery. Also, the assessment of the speaker of his own speaking is prone to be subjective. So, even though past experiences of the speaker of speaking is useful, it doesn't give objective assessment which can be used to improve the speaking skills for the speaker.

While speaking in front of a live audience, typically, a speaker 102 uses a computer (e.g., a laptop) 104, and a projector 106, which projects the content from the computer to a display 108. In such a typical scenario, the speaker has to read content by looking at the screen of the computer 104 and/or the display 108, hence eye-contact of the speaker with the audience is lost. This leads to a lesser engagement and effectiveness of the presentation from the speaker. Even though the speaker may prepare the content for delivery, there still remain some elements in the presentation for which the speaker may have to disengage from the audience and look at the display 108. Hence, the engagement with the audience is significantly impacted as the audience have less attention span, audience are distracted by their phones, and body language of the speaker is also impacted. Furthermore, there is a loss of continuity and flow in the delivery of the presentation, which is very important for engagement and impact of the presentation on the audience.

Since the eyes of the speaker are occupied to obtain cues from the presentation display, the speaker is not free to focus on the audience or the camera, the speaker is unable to focus on the vocal tonality and body language. Also, there's a challenge in memorizing the entire content or to perform the right body gestures for the speaker. Accordingly, there remains a need for providing cues to the speaker in a non-distracting manner without shifting focus from the audience.

SUMMARY

In view of the foregoing, an embodiment herein provides a processor implemented method for generating, triggering and playing, using a personal audio device coupled to a computing device, a sequence of audio files with cues for delivering a presentation for a presenter. The method includes (i) generating a sequence of audio files with cues for delivering a presentation, (ii) triggering playing an audio file from the sequence of audio files and (iii) playing the sequence of audio files one by one, on the computing device, using the personal audio device coupled to a computing device to enable the presenter to recall and speak the content based on the sequence of the audio files. The sequence of audio files with cues are generated by at least one of (i) selecting text from a file that includes content for the presentation or typing the text that includes a cue word or phrase, and automatically converting the text to speech, using a text-to-speech engine implemented by a processor, or (ii) recording the audio files, using a microphone coupled to the computing device, by speaking the at least one cue word or phrase. The audio file from the sequence of audio files is triggered to play by at least one of (i) pressing a button coupled to the computing device or through a personal video device, (ii) analysing a live speech by a presenter and detecting a pause. (iii) converting the speech to text, using automatic voice recognition, and parsing the text to detect a cue word or pattern, (iv) detecting a slide, a page, a bullet point, or a content in a presentation file, and determining at least one cue that corresponds to the slide, the page, the bullet point, or the content, or (v) detecting a gesture made by the presenter using a camera and a gesture recognition engine.

In some embodiments, the analysis of the live speech by the presenter and detection of the pause includes determining if a duration of a non-speech segment exceeds a threshold pause duration value. The non-speech segment is detected when an energy value of each band in an audio segment is less than a threshold energy value.

In some embodiments, the method includes determination of at least one approximate time window for the triggering the playing of the audio file from the sequence of audio files by applying a pause detection algorithm to a time interval that includes a time period of a start and an end of a corresponding text segment in a previous recording of the presentation.

In some embodiments, the method includes (i) recognizing a triggering gesture using a camera and a triggering gesture recognition algorithm applied to an image or video captured by the camera and (ii) triggering at least one of (i) playing an audio cue, (ii) rewinding or forwarding by skipping at least one previous or next audio cue, or (iii) changing a presentation slide, or (iv) rewinding or forwarding by skipping at least one previous or next presentation slide if the triggering gesture is recognized.

In some embodiments, the method includes playing a body language cue that indicates a body language gesture to be used by the presenter, that is selected from a body language gesture database. The body language cue is selected from at least one of a (i) body language audio cue that is played using the personal audio device coupled to the computing device, or a (ii) body language visual cue that is displayed on at least one of a personal video viewing device worn by the presenter or a display device.

In some embodiments, the method includes (i) recording at least one image or a video of the presenter using the camera that is coupled to the computing device, (ii) extracting at least one body language gesture from the at least one image or a video of the presenter, (iii) determining a body language score based on a comparison between the at least one body language gesture and a body language gesture database, (iv) recording the speech of the presenter using a microphone that is coupled to the computing device, (v) comparing the text that is obtained by converting the speech to text, using automatic voice recognition with a predefined presentation content to determine a content coverage score and (vi) determining a presentation impact score based on at least the content coverage score and the body language score.

In some embodiments, the method includes (i) dividing a predefined presentation content into a plurality of text segments, (ii) parsing each of the plurality of text segments to extract at least one potential cue word in each text segment using the natural language processing, (iii) automatically suggesting potential extracted cue words or phrases to the presenter, (iv) processing a selection or an input of cue words or phrases from the presenter, (v) training a machine learning model to automatically suggest more relevant audio cue that are personalized to the presenter based on the selection or the input of the cue words or phrases from the presenter and acceptance or rejection, by the presenter, of cues that are suggested using natural language processing. The potential cue words are extracted based on at least one uncommon word or phrase or key concept in the text segment.

In some embodiments, the method includes (i) comparing the text that is obtained by converting the speech to text in real time, using automatic voice recognition, with a predefined presentation content to determine a slide number that corresponds to a current speech of the presenter and (ii) automatically triggering a slide change in a presentation file associated with the predefined presentation content in the computing device based on the speech in real time.

In some embodiments, the method includes (i) associating a first presentation slide with a first light setting with a focus of light on the presenter, (ii) associating a second presentation slide with a second light setting with a focus on light on the second presentation slide displayed on a personal video device, (iii) automatically triggering the first light setting with the focus of light on the presenter by transmitting a first command to a smart lighting unit when the first presentation slide is displayed and (iv) automatically triggering the second light setting with the focus of light on the second presentation slide by transmitting a second command to the smart lighting unit when the second presentation slide is displayed.

In another aspect, a system includes a computer device coupled to a presentation data analysis server through a network for generating, triggering and playing, using a personal audio device coupled to the computing device, a sequence of audio files with cues for delivering a presentation for a presenter. The computing device includes: a processor; and a memory that stores a set of instructions, which when executed by the processor, causes it to perform: (i) generating a sequence of audio files with cues for delivering a presentation, (ii) triggering playing an audio file from the sequence of audio files and (iii) playing the sequence of audio files one by one, on the computing device, using the personal audio device coupled to a computing device to enable the presenter to recall and speak the content based on the sequence of the audio files. The sequence of audio files with cues are generated by at least one of (i) selecting text from a file that includes content for the presentation or typing the text that includes a cue word or phrase, and automatically converting the text to speech, using a text-to-speech engine implemented by a processor, or (ii) recording the audio files, using a microphone coupled to the computing device, by speaking the at least one cue word or phrase. The audio file from the sequence of audio files is triggered to play by at least one of (i) pressing a button coupled to the computing device or through a personal video device, (ii) analysing a live speech by a presenter and detecting a pause. (iii) converting the speech to text, using automatic voice recognition, and parsing the text to detect a cue word or pattern, (iv) detecting a slide, a page, a bullet point, or a content in a presentation file, and determining at least one cue that corresponds to the slide, the page, the bullet point, or the content, or (v) detecting a gesture made by the presenter using a camera and a gesture recognition engine.

In some embodiments, the system analyses the live speech by the presenter and detects the pause by determining if a duration of a non-speech segment exceeds a threshold pause duration value. The non-speech segment is detected when an energy value of each band in an audio segment is less than a threshold energy value.

In some embodiments, the system plays a body language cue that indicates a body language gesture to be used by the presenter, that is selected from a body language gesture database. The body language cue is selected from at least one of a (i) body language audio cue that is played using the personal audio device coupled to the computing device, or a (ii) body language visual cue that is displayed on at least one of a personal video viewing device worn by the presenter or a display device.

In some embodiments, the system (i) records at least one image or a video of the presenter using the camera (210) that is coupled to the computing device, (ii) extracts at least one body language gesture from the at least one image or a video of the presenter, (iii) determines a body language score based on a comparison between the at least one body language gesture and a body language gesture database, (iv) records the speech of the presenter using a microphone that is coupled to the computing device, (v) compares the text that is obtained by converting the speech to text, using automatic voice recognition with a predefined presentation content to determine a content coverage score and (vi) determines a presentation impact score based on at least the content coverage score and the body language score.

In some embodiments, the system (i) divides a predefined presentation content into a plurality of text segments, (ii) parses each of the plurality of text segments to extract at least one potential cue word in each text segment using natural language processing, (iii) automatically suggest potential extracted cue words or phrases to the presenter, (iv) process a selection or an input of cue words or phrases from the presenter, (v) train a machine learning model to automatically suggest more relevant audio cue that are personalized to the presenter based on the selection or the input of the cue words or phrases from the presenter and acceptance or rejection, by the presenter, of cues that are suggested using natural language processing. The potential cue words are extracted based on at least one uncommon word or phrase or key concept in the text segment.

In some embodiments, the system (i) compares the text that is obtained by converting the speech to text in real time, using automatic voice recognition, with a predefined presentation content to determine a slide number that corresponds to a current speech of the presenter and (ii) automatically triggers a slide change in a presentation file associated with the predefined presentation content in the computing device based on the speech in real time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which;

FIG. 7 illustrates a process flow of a method for analyzing real time voice data to play cues in real time based on an analysis of the voice data according to an embodiment herein;

FIG. 9 is a schematic diagram of a computer architecture in accordance with the embodiments herein.

DETAILED DESCRIPTION OF PREFERRED EMBODIMENTS

Figure 1:
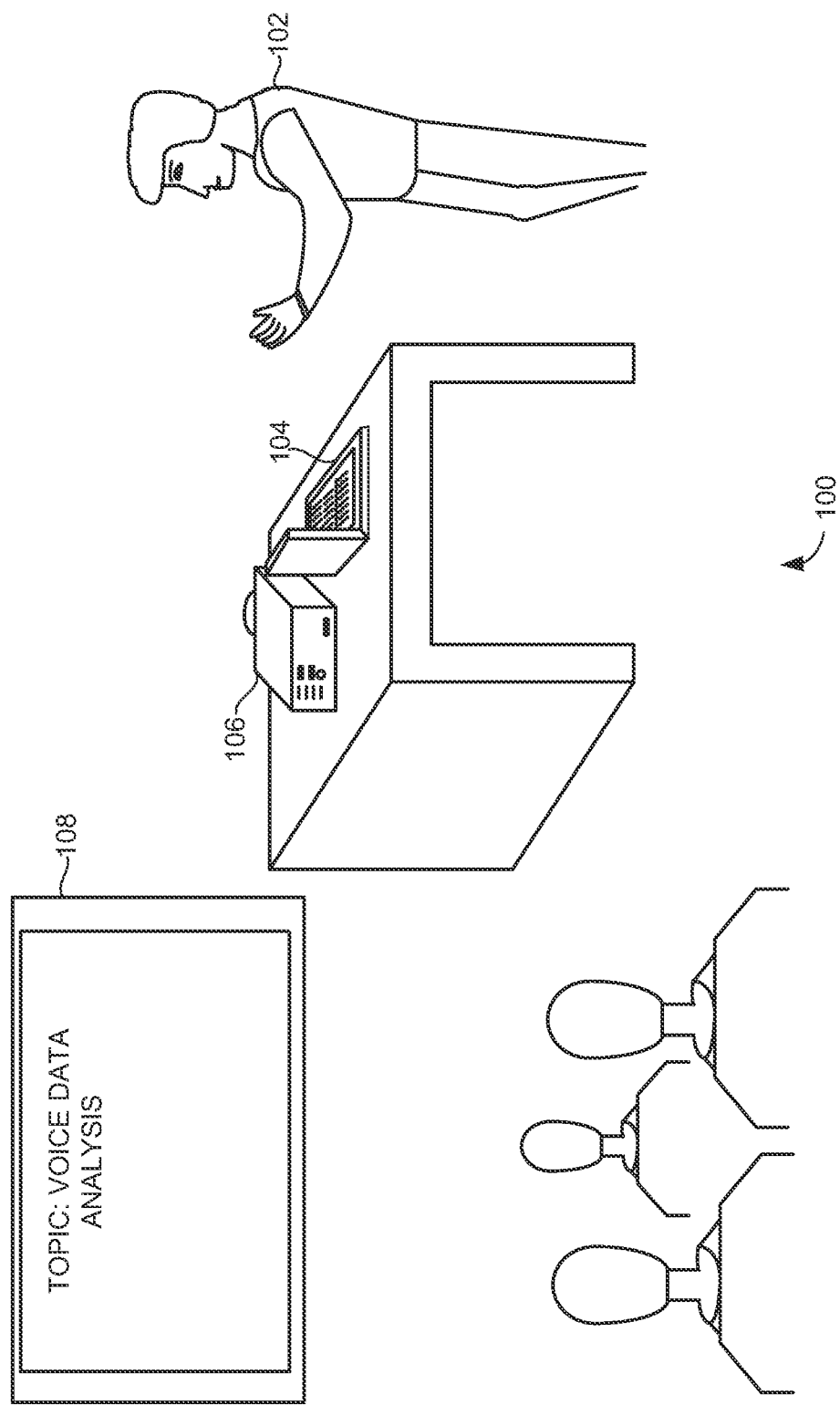

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and a method of cue generation to a presenter in real time. Referring now to the drawings, and more particularly to FIGS. 1 through 8, where similar reference characters denote corresponding features consistently throughout the figures, preferred embodiments are shown.

Figure 2:
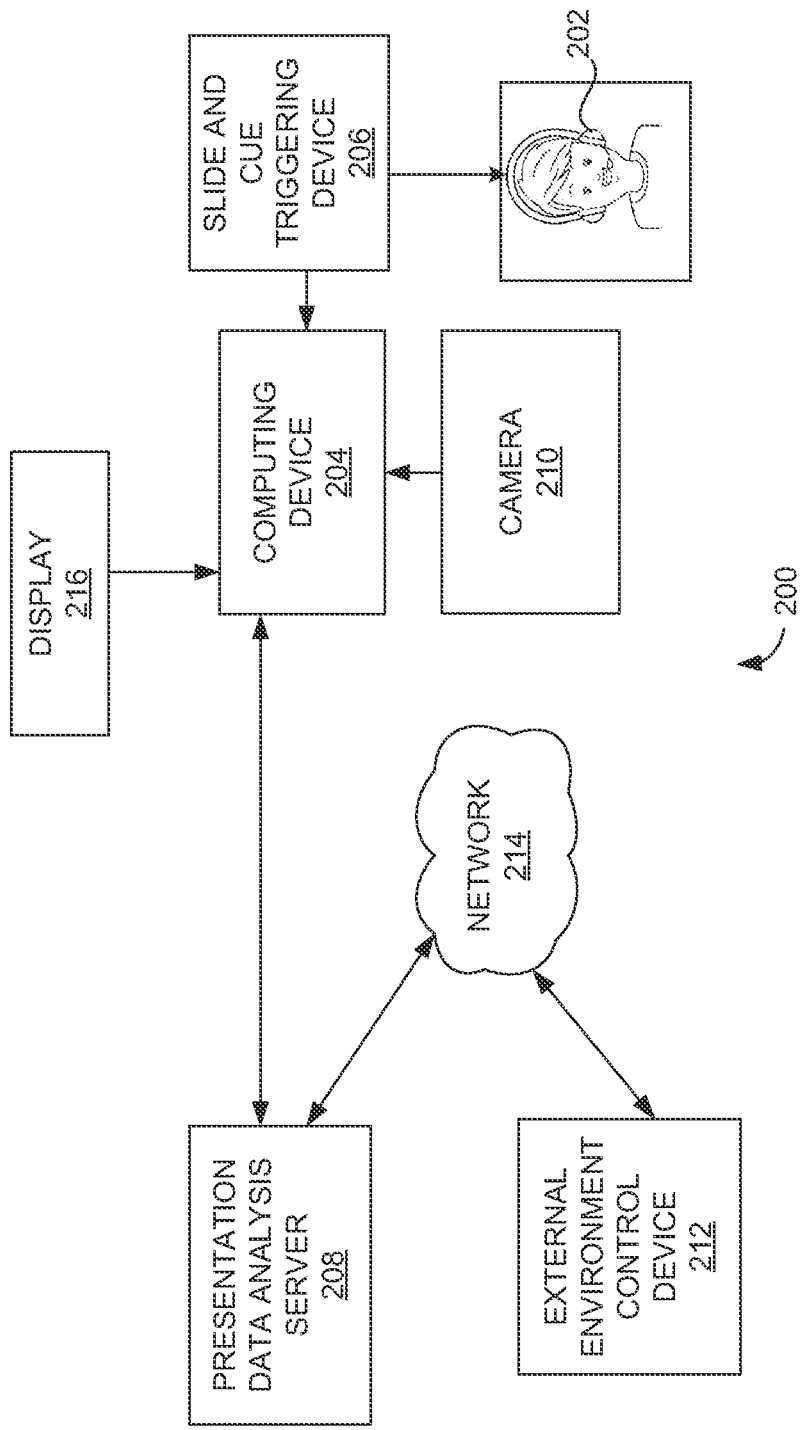
FIG. 2 illustrates a system view of a voice data analysis system in accordance with the embodiments herein.

FIG. 2 illustrates a system view of a voice data analysis system in accordance with the embodiments herein. The voice data analysis system 200 includes a personal audio device 202, a computing device 204 that is connected with a slide and cue triggering device 206, a presentation data analysis server 208, a camera 210, external environment control devices 212 and a display 216. The computing device 204 is connected with the presentation data analysis server 208 through a network 214. The computing device 202 includes a processor and a memory. The memory stores a set of instructions. The processor executes the set of instructions to perform (i) generating a sequence of audio files with cues for delivering a presentation, (ii) triggering playing an audio file from the sequence of audio files and (iii) playing the sequence of audio files one by one, on the computing device 204, using the personal audio device 202 coupled to a computing device 204 to enable the presenter to recall and speak the content based on the sequence of the audio files. The sequence of audio files with cues are generated by at least one of (i) selecting text from a file that includes content for the presentation or typing the text that includes a cue word or phrase, and automatically converting the text to speech, using a text-to-speech engine implemented by a processor, or (ii) recording the audio files, using a microphone coupled to the computing device, by speaking the at least one cue word or phrase. The audio file from the sequence of audio files is triggered to play by at least one of (i) pressing a button coupled to the computing device or through a personal video device, (ii) analysing a live speech by a presenter and detecting a pause. (iii) converting the speech to text, using automatic voice recognition, and parsing the text to detect a cue word or pattern, (iv) detecting a slide, a page, a bullet point, or a content in a presentation file, and determining at least one cue that corresponds to the slide, the page, the bullet point, or the content, or (v) detecting a gesture made by the presenter using a camera and a gesture recognition engine.

In some embodiments, the personal audio device 202 includes at least one of an earphone, a headset, car pods, AR/VR devices or personal video viewing device. In some embodiments, the computing device 204 includes at least one of a computer, a laptop, mobile or a tablet. In some embodiments, the slide and cue triggering module 206 includes at least one of a laser pointer, or a mobile. In some embodiments, the display 216 that screens slides to audiences.

The computing device 204 is communicatively connected with the presentation data analysis server 208 to provide and manage cues for a presenter for a selected presentation. The computing device 204 extracts speaking contents from the presenter in a form of text or voice. In some embodiments, the voice data analysis system 200 converts the voice into text or text into audio vice versa based on a cue preference of the presenter. In some embodiments, the speaking contents includes slides, a presenter view, text documents or audio files that may be stored in computer memory or cloud. The content may be extracted from a word document, ppt, and/or a google form to generate a presentation content text file. In some embodiments, the presentation content may be automatically synthesized from one or more sources such as a form that includes answers to questions, a presentation file, a document, an audio recording, a video, a website URL etc. The speaking content is divided into a set of words or sentences in memoizable text segments and suggested to the presenter, for example 3-4 sentences. The word limit for each text segment maybe configured by the presenter. These text segments may be divided based on natural language processing (NLP) contextual analysis to determine key concepts. Key concepts may be determined by use of machine learning for classifying cue phrases as discourse or sentential. Cue phrases may be used in a discourse sense to explicitly signal discourse structure, but also in a sentential sense to convey semantic rather than structural information. Two machine learning programs for discourse or sentential classification may be used to induce classification rules from sets of pre-classified cue phrases and their features. Machine learning may be used for automating the generation of cues by determining key concepts, but also for improving upon previous results. The voice data analysis system 200 generates and stores the cues based on the speaking contents automatically or manually by the presenter using the presentation data analysis server 208. In some embodiments, the voice data analysis system 200 manages the stored cues for the speaking contents based on presenter inputs using the presentation data analysis server 208.

The presentation data analysis server 208 uses Natural Language Processing (NLP) and Natural Language Understanding techniques to label the text segments as concepts, and extracts words or phrases that are key to remembering the text segment as a whole, which can act as mnemonics or cues. The cue words are determined using contextual analysis using natural language processing (NLP). The NLP model is trained using textual content and speech delivery patterns. A live audio of the speaking is recorded using a microphone of the computing device 204. The external environment control devices 212 controls one or more lights, one or more presenters and indoor temperature based on the slides and presenter preferences. The presenter wears the personal audio device 202 to receive real time audio cues. The presentation data analysis server 208 compares a recorded audio with the speaking content and determines percentage deviation from the speaking content. Based on the difference between the audio and the speaking content, the presentation data analysis server 208 may train the machine learning model 210 to generate cues based on the speaking content using the audio file of the delivered speech and cues actually used while delivering the speech. Also, the segmentation and placement of cues is used to train the machine learning model 210. The trained machine learning model 210 generates suggestions for text segment parsing and placement of the cues, length of the cues based on the analysis of the speech patterns. A threshold is determined for a length of a presenter's pause and if the pause extends the threshold, for example 5 seconds, next audio cue is played to the presenter using the personal audio device 202.

Additional intonation and body language cues may be generated on the basis of speaking content. The presenter may practice delivering intonation and body language cues ahead of the speaking event and audio or video record the delivery using the computing device 204. In some embodiments, the cues are recorded using the presenter's 202 own voice. A suggestion for intonations can be made by the presentation data analysis server 208. The presenter may record multiple audio files for each cue and select desired intonation for each cue. In some embodiments, the cues are provided by a coach or an expert and communicated to the presenter using the computing device 204. In some embodiments, the cues, intonation and body language cues are generated at a remote device and communicated to the presenter in real time using a voice data analysis application. The cues may be recorded using machine voice using text to voice converter. Multiple intonations, delivery style or accents may be suggested by the presentation data analysis server 208 using the machine learning model 210. The variation suggested may include stress on certain words or letters and less on others, pitch of delivery, tone of delivery, length of pauses etc. For example, if there are questions or pauses longer than may be 5 seconds the real time audio cueing module 206 recognizes it as non-regular pause but an intentional one, and mapping of speaking content to the live recording audio may be paused.

In some embodiments, the body language cues are generated at a remote device and communicated to the presenter in real time using the computing device 204. The body language cues maybe in the form of a video of a person performing that cue or in the form of a humanoid object performing the cue which is displayed to the presenter using a personal video device. In some embodiments, the presenter combines his speaking content with the voice data analysis application, using voice recognition, the presentation data analysis server 206 shows relevant slides in synchronization with the live speech of the presenter. In some embodiments, predetermined body language gestures of the presenter or the words in the speech are recognized by the presentation data analysis server and luminosity in the room is controlled by giving commands to one or more external environment control devices 212 to maintain focus on the presenter when he is speaking and to the personal video device, when he is referring to the content displayed. The one or more external environment control devices 210 may detect immediate environmental data of the subject 202. For example, noise level in indoor or outdoor environment, lighting and lamination level at multiple different location in the room, movements etc. The computing device 204 and one or more external environment control devices 212 may communicate with each other and with the presentation data analysis server 208 using a wireless network or directly by non-network connections.

In an embodiment, an additional electronic device or one or more sensors sense micro-expressions, gestures and voice data of the presenter using a camera and a microphone and communicate to the presentation data analysis server 208 to generate feedback and to train a machine learning model 210. In an embodiment, the presentation data analysis server 206 includes a trained machine learning model 210 to generate time stamped cues from an input of events from an event calendar of the presenter and speaking content from an electronic device. The presentation data analysis server 208 recognizes a need to use cues based on the machine learning model 210 input or an input from the presenter or based on body language or use of predetermined words in speech by the presenter. For example, different type of audience responds to different delivery style. Also, the presenter has certain predisposition for a delivery style. e.g. empathetic, enthusiastic, call for action, criticizing, friendly etc. According to the goal of the presentation, the delivery style may be chosen. Also, the predisposition of the presenter and the audience is considered, and the best scoring match of speaking style program is selected. One or more of (i) content preparation time, (ii) suggested delivery style (iii) where to take pauses, (iv) which questions to ask to the audience, (v) anecdotal inputs extracted from websites, (vi) possible spaces for cues are generated by the presentation data analysis server 208 using machine learning model 210. In an embodiment, the program is a virtual reality-based visualization to prepare for the speaking ahead of time. In an embodiment, the program generates a set of instructions from another device for support in case of pre-recognized need or input by the presenter. In an embodiment, the laptop or desktop or mobile front camera is used to detect micro expressions and body language of the presenter. In addition, micro phone is used for voice recording. Micro expressions may be detected by selecting relevant face regions, extracting spatiotemporal features, and detection and recognition of micro expressions using supervised or non-supervised machine learning algorithms.

Figure 3:
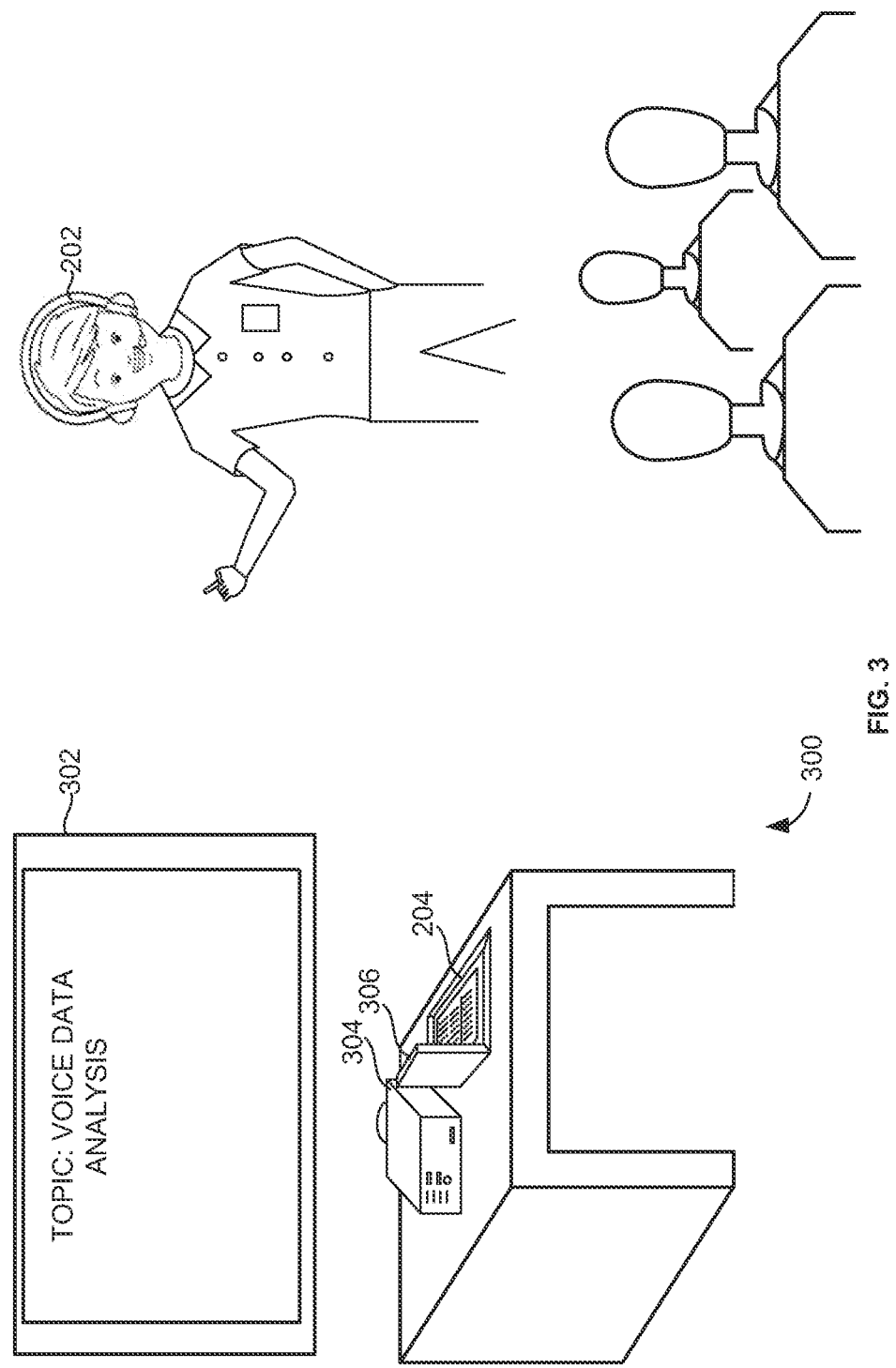
FIG. 3 illustrates an exemplary view of the voice data analysis system of FIG. 2 according to an embodiment herein.

FIG. 3 illustrates an exemplary view 300 of the voice data analysis system of FIG. 2 according to an embodiment herein. The presenter is wearing a headphone set and a collar mike as shown. The computing device 204 is a laptop that is used to record speech and body language of the presenter using a front camera 306 of the computing device 204. The recorded video and audio are used to train machine learning model to determine accurate cue generation and delivery. The presenter may be displayed the body language cues using the personal video device of the computing device 204. A live audio of the presenter's voice is compared against the content of the slide being displayed on personal video device 302 using a projector 304, and cues may be played to the presenter accordingly a teach text segment of the content or at the beginning of a new text segment. The slides may change according to voice data analyzing to determine relevant slide at the real time audio cueing module. External environment control devices may be tuned in to recognize when the focus is on the slides or on the presenter and luminance level is adjusted in room. In some embodiments, the external environment control devices control one or more lights, one or more presenters and indoor temperature based on the slides and presenter preferences.

In some embodiments, the presenter is able to tag audio cues to the slides being displayed on a projector device 304. The audio cue tagged to the slide may be played to the personal audio device on change of the slide by the presenter. At the change of the text segment associated to the content being delivered using speech, the slide may be changed. The slides may be changed in predetermined order of the text segment but may change order if the presenter changes the order of the text segments while delivering the speech. In some embodiments, if the presenter is delivering speech that is associated with the slide, the lights in the room are adjusted so that slides are in focus, conversely, when the presenter is delivering speech not referring to the slide displayed, lighting in the room is adjusted so that the presenter is in focus. for example, lights focusing on the presenter are switched on or the lamination level in the room is adjusted to focus on the face of the presenter. Similarly, the external environment control device 212 may adjust temperature in the room and volume of one or more devices on receiving a trigger from the presenter.

Figure 4:
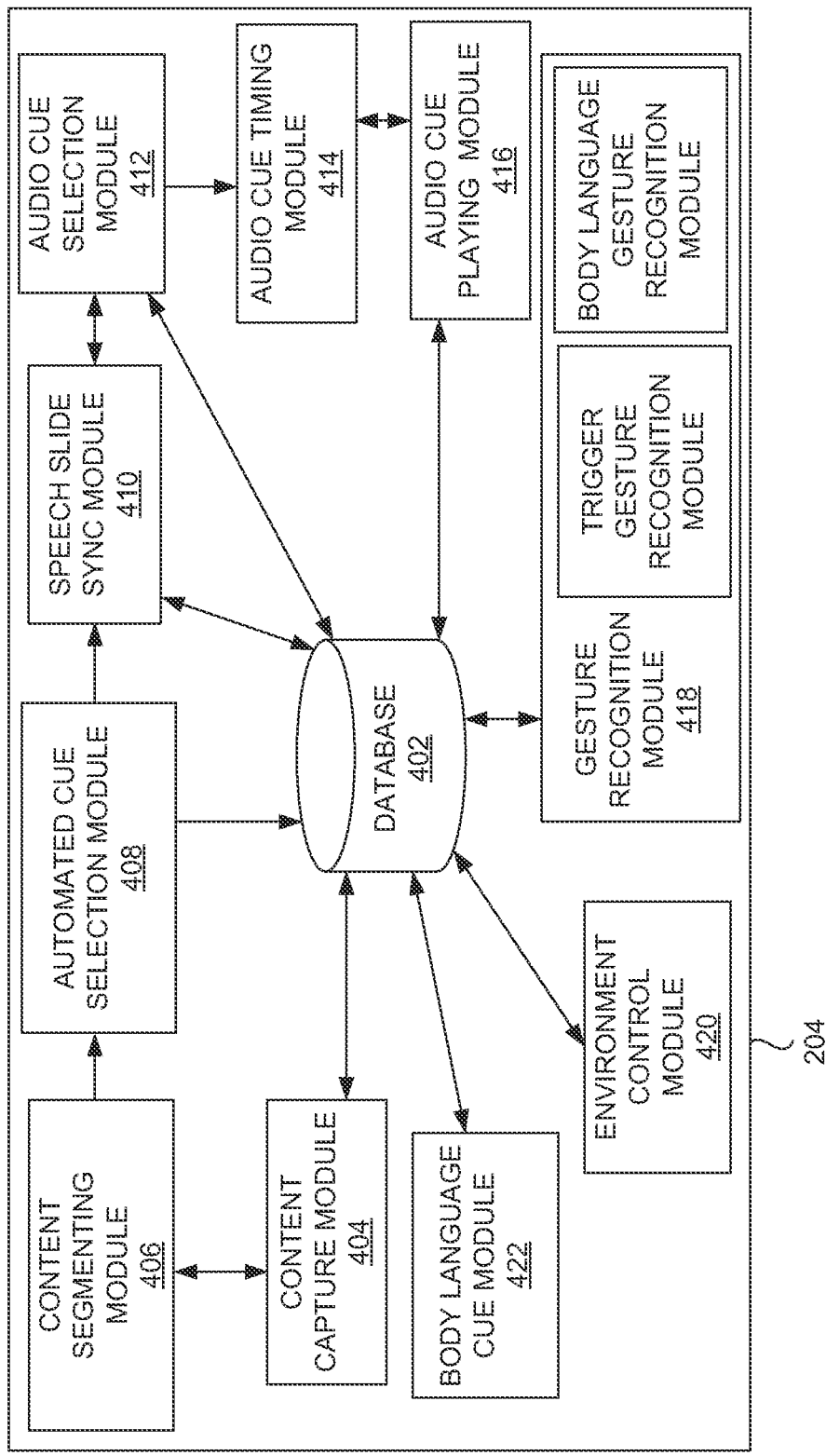
FIG. 4 illustrates an exploded view of a computing device of FIG. 2 according to an embodiment herein.

FIG. 4 illustrates an exploded view of the computing device 204 of FIG. 2 according to an embodiment herein. The voice data analysis system 200 includes a data base 402, a content capture module 404, a content capture module 406, an automated cue selection module 408, a speech slide sync module 410, an audio cue selection module 412, an audio cue timing module 414, an audio cue playing module 416, a gesture recognition module 418, an environment control module 420 and a body language cue module 422. The database 402 that is connected to the presentation data analysis server 208. The content capture module 404 captures the speaking content from text and stores in the database 402. The speaking content may be obtained in the form of text, or in the form of voice, which may then be converted into text. In some embodiments, the speaking content may be automatically synthesized from one or more sources such as a form that includes answers to questions, a presentation file, a document, an audio recording, a video, a website URL etc. In an embodiment, the presenter may browse on the computing device 204 to select a content source, display questions for content building and answers may be extracted from different sources stored online or in the computing device 204 memory, or the presenter may drag and drop text segments from the selected content. The content segmenting module 406 divides the speaking content into text segments of words or sentences. In some embodiments, the speaking content in real-time is converted from the audio stream into a text stream of the spoken content for comparison with the speaking content. The automated cue selection module 408 parses the text segments to determine key concepts and extracts cues for each of the text segments. The automated cue selection module 408 determines the cues using contextual analysis using Natural Language Processing (NLP). In some embodiments, the audio cues are personalized to the presenter based on analysis of patterns of cue selection that may include placement of the cue in a sentence, number of cues per segment, sentences per segment, mean length of the cue, concepts extracted from reverse keyword-based Natural Language Processing (NLP) analysis, preferred concepts, preferred words, unique words used by the presenter etc.

In some embodiments, a machine learning model provides cues based on the determined key concepts. The speech slide sync module 410 captures the real time audio of the voice of the presenter delivering the speaking content and maps it to the speaking content to determine the text segment the presenter is at. The real time audio may be mapped to the speaking content using a regularized linear regression method. The regularized linear regression method may estimate semantic features associated with the real time audio of the presenter delivering the speaking content and may be mapped with semantic features of the semantic content. For example, the words "month" and "week" are very similar (the correlation between the two is 0.74), while the words "month" and "tall" are not (correlation −0.22). In some embodiments, the cues are played to the presenter at each text segment of the speaking content or at the beginning of a new text segment by comparing a live audio of the presenter's voice with the speaking content of the slide being displayed on display 302 using the projector 304. The presenter may combine an audio for the speaking contents using voice recognition. In some embodiments, the speech slide sync module 410 analyses the audio provided by the presenter for the speaking contents and determines a relevant slide. The speech slide sync module 410 displays the relevant slide that is synced with the live audio of the presenter and provides the cue.

Based on the text segment of the content, the audio cue selection module 412 selects the audio files of the cues for the text segment. The audio cue timing module 414 analyses the real time audio of the voice of the presenter to determine a timing for placement of each cue in the text segment being delivered. The audio cue timing module 414 may detect a pause in the speech or an input of a trigger by the presenter or end of first text segment and beginning of a second text segment. The audio cues may be recorded by the presenter in their own voice, in a machine voice for text to voice converter or a coach's voice. If the pause is longer than a predetermined threshold, the audio cue from the text segment is determined to be played.

The cue playing module 416 determines a set of audio cues from the speaking content and the timeline of playing each of the set of audio cues at appropriate text segment. The cue playing module 416 selects the relevant audio cue and plays it up till the point where the audio cue is completed, and switches to the next audio cue in the text segment. The audio cues may be played at the end of first text segment or at the beginning of a second text segment or during pauses longer than the predetermined threshold. In some embodiments, the machine learning model detects the timeline of playing each of the audio cues. The audio cue timing may be supplemented by preconfiguring approximate timing for the audio cues based on a trial presentation made by the presenter using the speaking content and measuring the time intervals where the corresponding text segments start and end. This may optimize the computational resources needed for real-time audio cue. In some embodiments, the Natural Language Processing (NLP) determines the context of the speech to recognise an audio cue from the set of audio cues is to be delivered to the presenter or not. For example, if the presenter uses different words to deliver a specific content, the audio cue from the set of audio cues for that timeline is considered to be nullified. The speaking may be streamed live to a remote device and audio cues may be generated from the remote device. The cues from the remote device may be generated by a person or artificial intelligence (AI). The audio cue playing module 416 may include simulation and virtual reality-based models for preparation for a scheduled speaking event. In an embodiment, real time audio of the speaking voice is analysed to detect sections where cues have to be inserted based on voice to text conversion and pause detection as determined by the presentation data analysis server 306. The audio cue playing module 416 may play the audio files containing relevant cues at appropriate pauses in real time.

The gesture recognition module 418 includes trigger gesture recognition module and body language gesture recognition module. The gesture recognition module 418, based on gestures provides by the presenter, (i) provides cues to the presenter and (ii) controls the slides that displayed on the display. In some embodiments, the gesture recognition module 418 recognizes triggering gestures or body language gestures. The triggering gesture recognition may be used to trigger playing the audio cue file. In some embodiments, the body language gesture recognition used to associate actual body language gestures with corresponding presentation content. In some embodiments, the actual body language gestures are compared with optimum body language gestures to generate the presentation impact scores for body language, and to provide feedback to the presenter on how to improve their body language while presenting. The environment control module 420 controlsone or more lights, one or more presenters and indoor temperature based on the slides and presenter preferences. In some embodiments, predetermined body language gestures of the presenter or the words in the speech are recognized by the presentation data analysis server 208. Luminosity in the room is controlled by giving commands to one or more external environment control devices 112 to maintain focus on the presenter when the presenter is speaking and to the screen, when the presenter is referring to the content displayed. In some embodiments, if the presenter is delivering speech that is associated with the slide, the lights in the room are adjusted so that slides are in focus, conversely, when the presenter is delivering speech not referring to the slide displayed, lighting in the room is adjusted so that the presenter is in focus. For example, lights focusing on the presenter are switched on or the lamination level in the room is adjusted to focus on the face of the presenter.

In some embodiments the body language cue module 422 computes a score for the speaking based on predetermined determinants. For example, body language may include (i) use of hand gestures, (ii) upright posture, and (iii) eye contact etc. Speech delivery may include (i) tone of the speech, (ii) volume, (iii) speed, (iv) appropriate pause time, (v) stressing a preselected word, and (vi) percentage of the content covered. Correction score is calculated based on which the presentation data analysis server 208 generates corrective recommendations for the presenter. The corrective recommendations may be generated in real time. Multiple speaking scores may be recorded and comparative analysis on the progress is generated for the presenter on speaking delivery. In some embodiments, body language of the presenter is analyzed using one or more camera or camera of the computing device 204. In some embodiments, the humanoid form of a gesture is displayed on a user interface of the computing device 204 along with an audio cue played at the personal audio device 102. In some embodiments, body language cues are generated at a remote device and communicated to the presenter in real time using the computing device 204. The body language cues may be in the form of a video of a person performing that cue or in the form of a humanoid object or avatar performing the cue which is displayed to the presenter using a screen or a personal video viewing device.

Figure 5:
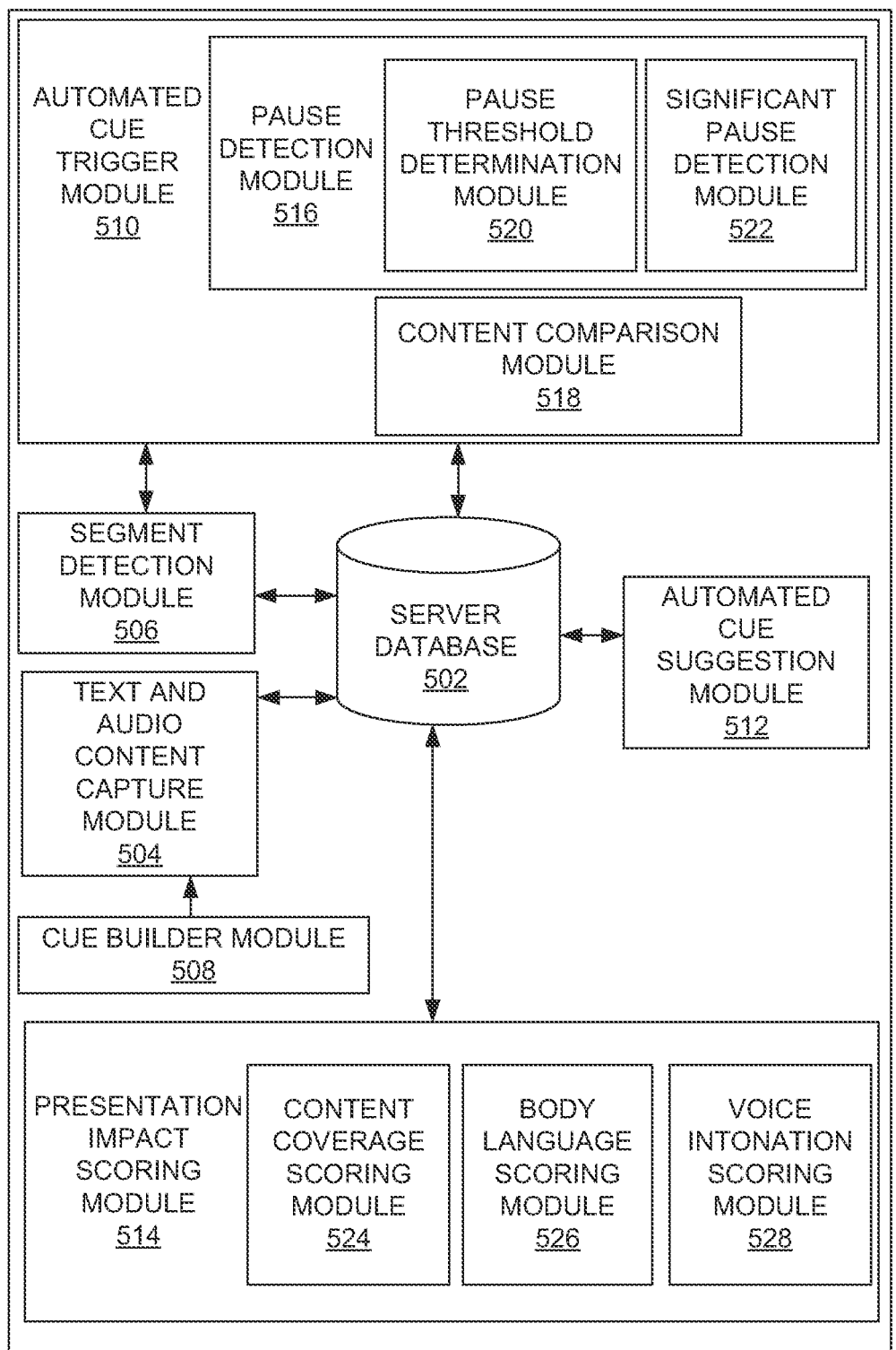
FIG. 5 illustrates an exploded view of a presentation data analysis server of FIG. 2 according to an embodiment herein.
Figure 6B:
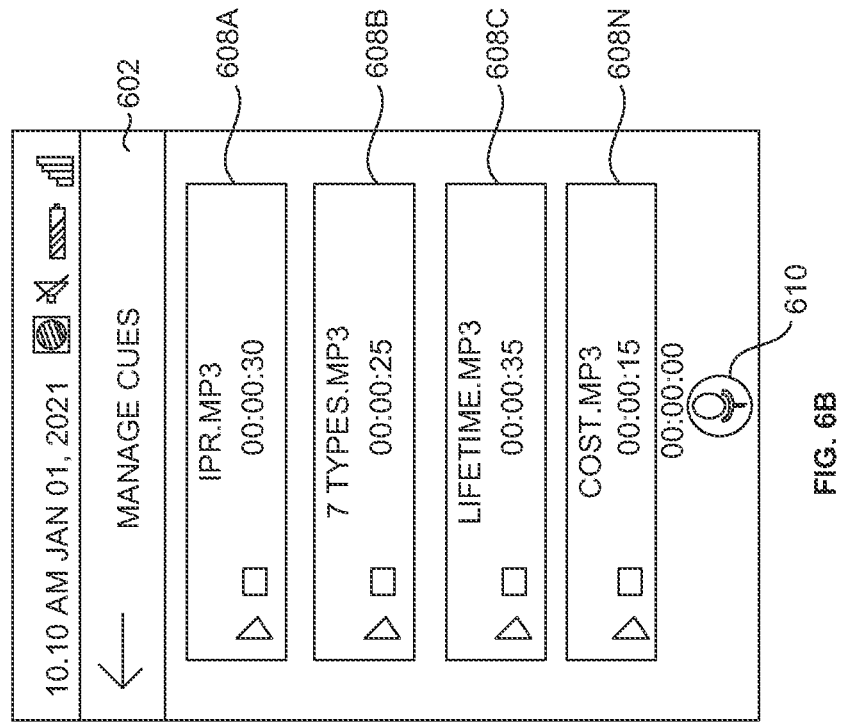
FIG. 6A to 6E illustrate an exemplary embodiment of user interfaces of computing device with the voice data analysis system according to an embodiment herein.
Figure 6A:
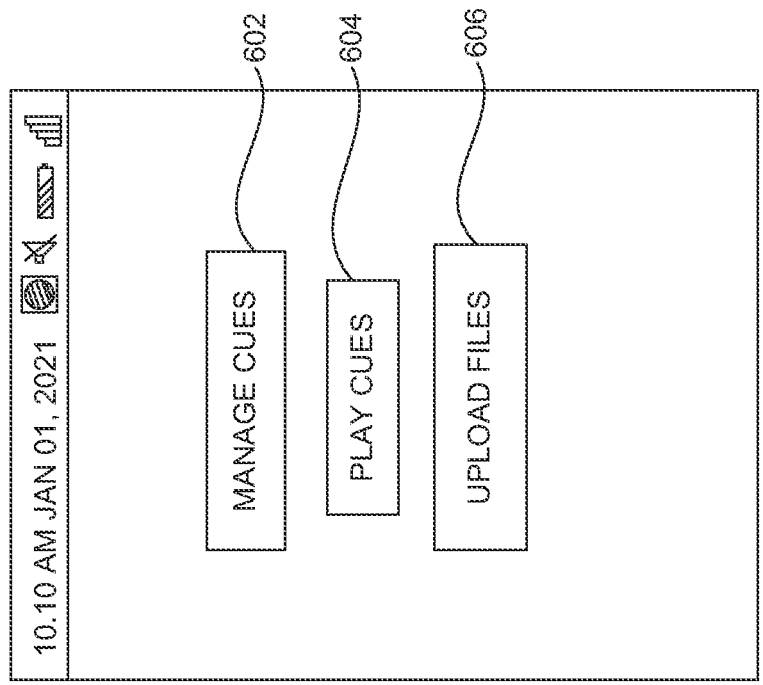
Figure 6D:
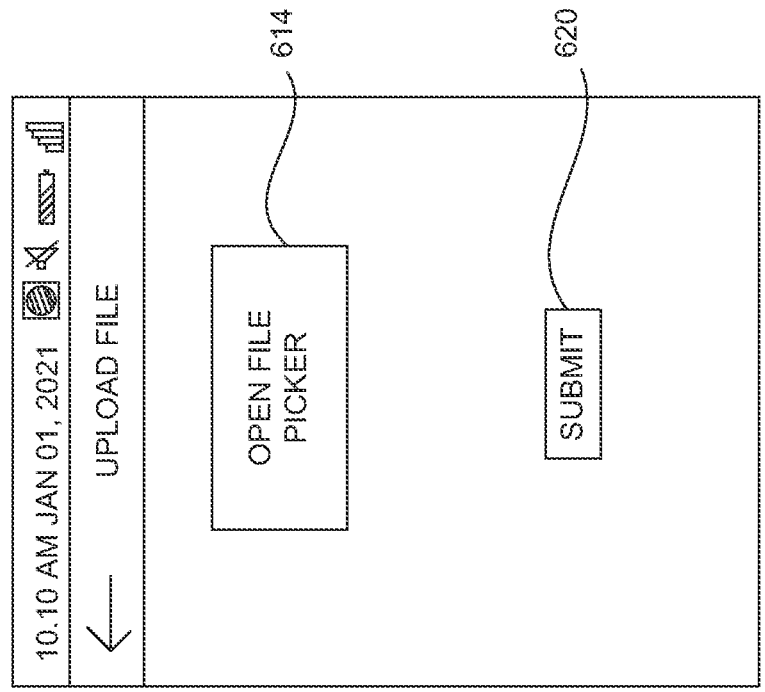
Figure 6C:
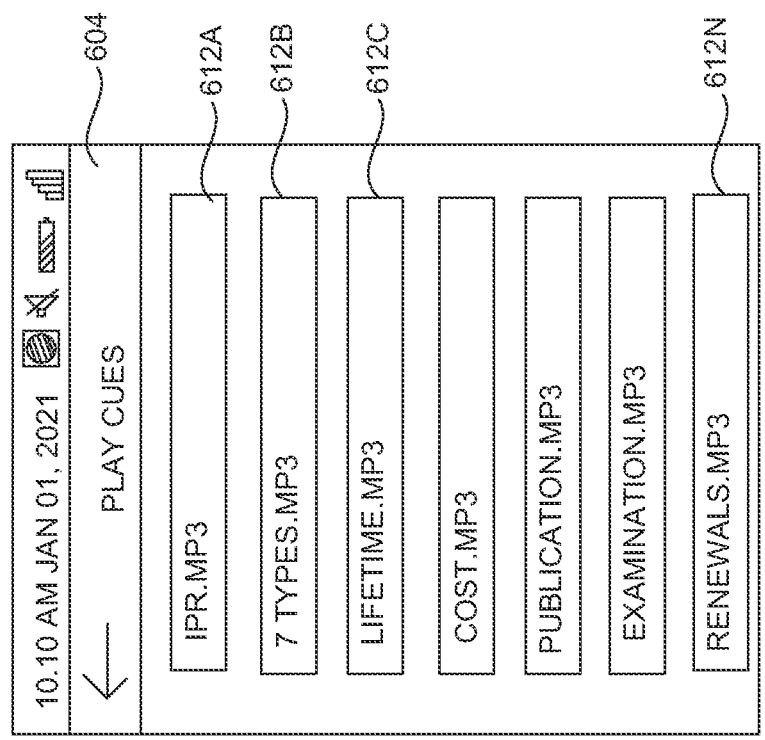
Figure 6E:
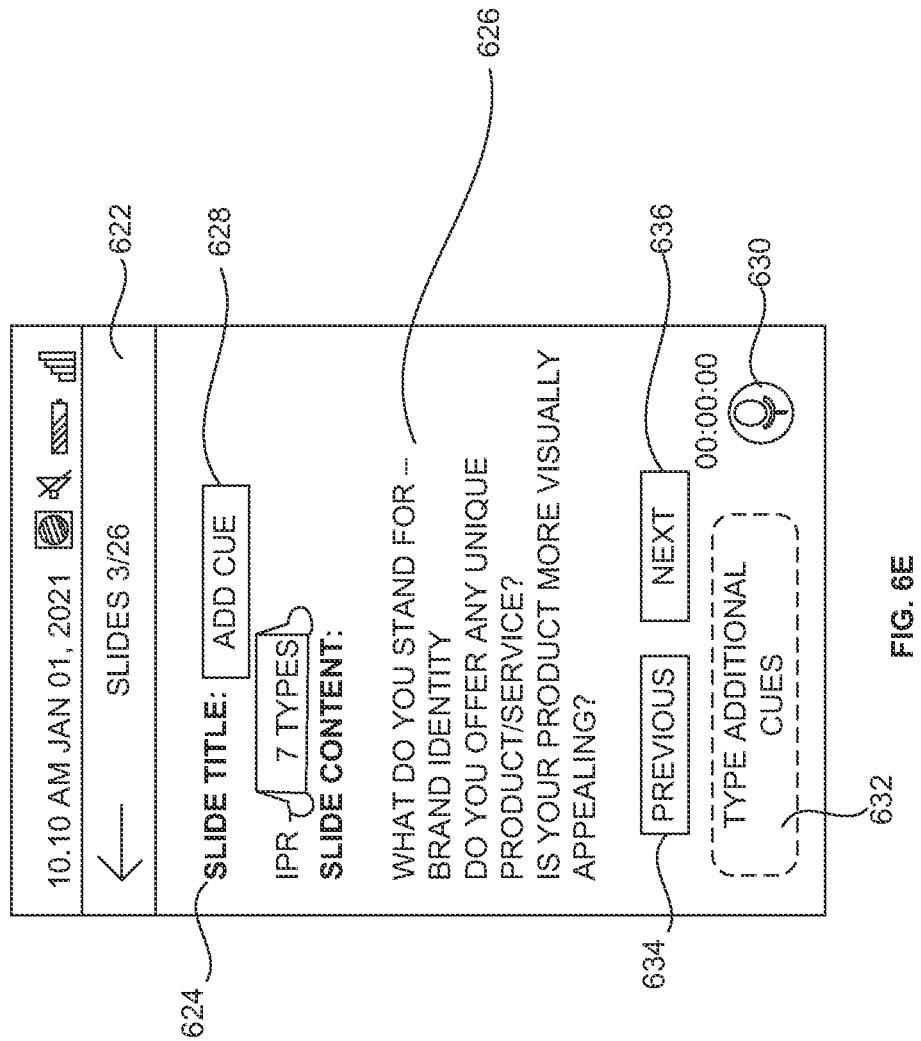

FIG. 5 illustrates an exploded view of the presentation data analysis server 208 of FIG. 2 according to an embodiment herein. The presentation data analysis server 208 includes a server database 502, a text and content capture module 504, a segment detection module 506, a cue builder module 508, an automated cue trigger module 510, an automated cue suggestion module 512 and a presentation impact scoring module 514. The text and audio content capture module 504 capture the speaking content text and delivered speech. In some embodiments, the speaking content in real-time is converted from the audio stream into a text stream of the spoken content for comparison with the speaking content and the text and audio content capture module 504 captures deviation in words, word count, and total percentage deviation. In some embodiments, number of text segments, number of sentences per text segment, number of commas per text segment, presence of a heading or a sub heading, presence of a noun is captured is communicated to the server database 502. The presenter selects number of text segments, number of sentences, commas per text segment that is recorded and communicated to the server database 502. The comparison is made by the text and audio content capture module 504 and mean text segment length associated to the concept, position of the cues in relation to the sentences may be generated by a trained machine learning module. The Natural Language Processing (NLP) based sentence grouping and keyword extraction is compared to the selection made by the presenter or a user and the deviation is recorded. The presenter selected audio cues and sentence grouping for text segment is used to train amacrine learning model.

In some embodiments, if there is an interruption, and the presenter digresses from the speaking content, the text and audio content capture module 504 starts to analyse content deviation and detects when the presenter is getting back to the speaking content in real time. This analysis is used to determine cue placements and reset the timings of the audio cues accordingly by areal time audio cueing module in real time.

In some embodiments, the audio cues are personalized to the presenter based on analysis of patterns of cue selection that may include placement of the cue in a sentence, number of cues per segment, sentences per segment, mean length of the cue, concepts extracted from reverse keyword based Natural Language Processing (NLP) analysis, preferred concepts, preferred words, unique words used by the presenter etc. The segment detection module 506 determines the key concept based on grouping of the sentences and an input by an user or the presenter. The machine learning segment detection module compares the length of the text segment to the time taken to deliver the text segment, number of cues generated, number of audio cues used, NLP based contextual analysis of the text segments and determines length of text segments. The cue builder module 508 uses Natural Language Processing (NLP) is a Natural Language Processing (NLP) based cue builder, The cue builder 508 uses Natural Language Understanding techniques to label the text segments as concepts, and extracts words or phrases that are key to remembering the text segment as a whole, which can act as mnemonics or cues. The cue builder module 508 keeps track of most selected cues and determines the concepts related to the selected cues. This analysis is used to predict the most appropriate cues for the presenter. In some embodiments, the cue builder module 508 personalises the cues generated to the presenter based on the historical cue selection pattern, age, profession, the content domain etc.

In some embodiments, the automated cue suggestion module 512 suggests cues using machine learning model or based on Natural Language Processing (NLP) cue selection. The automated cue suggestion module 512 compares the cues selected by the presenter, the audio cues suggested to the presenter in real time and the speech segment after predetermined time, for example 30 seconds, after the audio cue is played to determine if the audio cue is used by the presenter or not. Based on this analysis, scores for each audio cue is generated and analysis is done based on the context, and placement of the cue in the sentence. This data is used to train the machine learning model to generate audio cues with more probability of being used and are stored in the machine learning database. If the played audio cue was not used by the presenter, the reason is determined from (i) the presenter was delivering content unrelated to the speaking content, (ii) the presenter already covered the point in some other text segment or using alternative words, (iii) placement of the cue was not correct, and (iv) timing of the cue was not correct. For such analysis, Natural Language Processing (NLP) based techniques are used to determine if the content was delivered at some other point using alternative words or if the text segment was partially delivered or if timing was wrong as the presenter was speaking about unrelated content. The frequently failed or generic words using audio cues are determined to be ineffective and alternatives may be suggested by the cue suggestion module 512. The more selected and actually used audio cues are determined and similar audio cues are suggested using Natural Language Processing (NLP) analysis by the cue selection module. In some embodiments, the cue suggestion module 512 is able to stitch separate audio files or segments to be able to play only the relevant audio cue, and move on to the next cue without being stuck and optimise time to play an audio cue.

The automated cue triggering module 510 includes a pause detection module 516 and a content comparison module 518. The pause detection module includes a pause threshold determination module 520 and a significant pause detection module 522. The pause detection module 516 optimizes computational requirements for pause detection. In some embodiments, the audio cue timing algorithm is supplemented by preconfiguring approximate timing for the audio cues based on a mock or trial presentation made by the presenter. The time intervals where the corresponding text segments start and end is measure using the predetermined presentation content. In some embodiments, the time intervals optimize the computational resources required for real-time voice data analysis. The pause threshold determination module 520 determines a threshold for a length of a presenter's pause and if the pause extends the threshold. For example, 5 seconds, next audio cue is played to the presenter using the personal audio device 202. In some embodiments, the machine learning model compares the audio cues suggested to the presenter in real time and the speech patterns and optimal length of the pause to play the audio cue, and the ratio of the length of the audio cue and the length of the pause are determined. It is important to accurately determine the time segment when the audio cue is played to determine accurate position to play the audio cues and to avoid playing and audio cue at wrong placement which may mislead the presenter. The audio cue that is played late or before the right time for the placement of the audio cue would be useless and the presenter may start speaking about a different topic. The machine learning model determines a correct time and right placement of the audio cue to be played. The pauses in the speech are detected by analyzing speech patterns. The machine learning model generates more accurate predictions for pauses that helps the real time audio suggestion module 512 to expect pauses and place the selected audio cue to be played in real time. The significant pause detection module 522 analyses the pause patterns and determines significant pauses where additional audio cue is to be played and insignificant pauses where the pause do not need additional audio cues.

The content comparison module 518 converts the speech to text, using automatic voice recognition, and parses the text to detect a cue word or pattern. In some embodiments, the content comparison module 518 detects a slide, a page, a bullet point or a content in a presentation file, and determine at least one cue that corresponds to the slide, the page, or the content. In an embodiment, if the presenter deviates from the speaking content, no cues are played until the presenter starts speaking content associated to one or more text segments. The slide, the page or the bullet point, or the content in the presentation file may be detected using a visual detection method. The visual detection method may include neural networking model that may be trained to detect a slide on the display screen 302 using a visual input captured from an image capturing device. The visual detection method may include image classification, object detection, object tracking, semantic segmentation and instance segmentation.

The presentation impact scoring module 514 includes a content coverage scoring module 524, a body language scoring module 526 and a voice intonation scoring module 528. The presentation impact scoring module 514 compares the audio cues suggested to the presenter in real time and the speech patterns and optimal length of the pause to play the audio cue, and the ratio of the length of the audio cue and the length of the pause are determined. It is important to accurately determine the time segment when the audio cue is played to determine accurate position to play the audio cues and to avoid playing and audio cue at wrong placement which may mislead the presenter. Also, the audio cue that is played late or before the right time for the placement of the audio cue would be useless and the presenter may start speaking about a different topic. The presentation impact scoring module 514 determines the correct time and right placement of the audio cue to be played. The pauses in the speech are detected by analyzing speech patterns. And more accurate predictions for pauses is generated by the presentation impact scoring module 514 which helps the real time audio cueing module 106 to expect pauses and place the selected audio cue to be played in real time.

In an embodiment, the presenter selects the placement of pauses and the length of the pauses to be delivered in speech. If the length of the pauses or the number of pauses are more than a predetermined length and numbers additional cues may be generated and played in real time to the presenter. In some embodiments, the presentation impact scoring module 514 determines the deviation in words, word count, and total percentage deviation by convert the speaking content in real-time in the audio stream, into a text stream of the spoken content and compare with the speaking content. The machine learning pause detection module 516 determines the pauses that are significant for playing one or more audio cues. The pause detection module 516 analyses the pause patterns and determines significant pauses where additional audio cue is to be played and insignificant pauses where the pause do not need additional audio cues. The body language scoring module 526 receives the desired or preconfigured body language, or desired body language in a video recorded from the presenter or a coach and compares the body language in a video of the presenter delivering speech using one or more camera or camera of the computing device 204. Comparison may be made for posture, angle and angle of each of the predetermined joints. For example neck, left and right shoulders, left and right hips and left and right knees of the presenter. The voice intonation scoring module 528 correlates the content delivered at instant time, tone of the voice of the presenter and body language associated with it. The voice intonation scoring module 528 determines the effectiveness of the delivery and makes suggestions to the presenter to maximise impact of the speech delivery.

FIG. 6A to 6E illustrate an exemplary embodiment of user interfaces of computing device 204 with the voice data analysis system 200 according to an embodiment herein. The voice data analysis system 200 provides one or more options to create and manage cues. In some embodiments, the one or more options includes manage cues 602, play cues 604 and upload files 606. In some embodiments, the manage cues 602 enables a presenter to perform actions on the cues such as create, edit, sort, rename delete etc. In some embodiments, the play cues 604 enables the presenter to play the cues. In some embodiments, the upload files 606 enables the presenter to upload a presentation into the voice data analysis system 200. When presenter selects the manage cues 602, the voice data analysis system 200 shows cues 608A-N that are created for a presentation. The presenter may select a cue 608A and performs actions such as sorting, deleting, renaming or editing etc. In some embodiments, the presenter performs actions on the shown cues 608A-N by click and drag a cue. The presenter records a cue using a record 610. The voice data analysis system 200 saves the audio collected by the record 610 from the presenter. In some embodiments, the presenter creates the cues by at least one of (i) selecting text from a presentation document, (ii) record an audio or (iii) providing text and converting it into a cue. The presenter plays saved cues 612A-N corresponds to a selected presentation. In some embodiments the voice data analysis system 200 enables the presenter to play the saved cues 612A-N using volume up and volume down button of the computing device 204.

The presenter uploads a presentation document into the voice data analysis system 200 using the upload files 606. When the presenter selects the upload files 606, an open file picker 614 is provided to upload the presentation file. The presenter selects the presentation file from at least one of a cloud or the computing device 204 using the open file picker 616. The presentation file location is shown and presenter uploads the presentation file into the voice data analysis system 200 using submit 620. When the presenter opens the uploaded presentation file a slide number 622 and contents of the presentation file are shown. The contents of the presentation file include a slide title 624 and a slide content 626. In some embodiments, the presenter creates the cues by at least one of (i) selecting text 628 from the slide title 624 and the slide contents 626, (ii) record an audio using a record 630 or (iii) providing text using text box 632 and converting it into a cue. The presenter may navigate in the presentation file using a next 634 and a previous 636.

In some embodiments, Natural language processing techniques may be used to group the texts and extract one or more concepts. The presenter may select the range of the word count. The presenter may accept, reject the cues and generate new cues according to the presenter's preference. A word count of each segment may be displayed. The word count of the selected text segment and projected time for covering the text content using voice may be displayed. The presenter may be able to drag and drop part or whole of the text segment. The presenter may be able to extract suggestions. The presenter may be able to select cues and record audio files of each of the selected cues. The presenter may record the speaking content in his voice to determine the time taken to deliver the content and placement for each of the audio cue may be determined. While delivering the speech, this may help to find the audio cue placement time for each of the selected audio cue efficiently. In an embodiment, if the presenter deviates from the speaking content, no cues are played until the presenter starts speaking content associated to one or more text segments. The presenter may save multiple audio files for each of the audio cue in different intonations. The presenter may select the audio file to be played at each of the text segments while delivering the speech. The cues may be re-recorded with case. The time duration of each of the selected audio cues may be displayed. The presenter may select part of the audio cue, split audio cues or generate multiple intonations of each of the audio cues. In some embodiments, audio cues for body language may be generated. The body language audio cues may be based on body language analysis of the presenter by one or more camera or camera of the computing device 204. In some embodiments, the humanoid form of a gesture is displayed on the user interface of the computing device 204 along with an audio cue played at the personal audio device 202.

FIG. 7 illustrates a process flow of a method for analyzing real time voice data to play cues in real time based on an analysis of the voice data according to an embodiment herein. At step 702, a sequence of audio files with cues is generated for delivering a presentation. The sequence of audio files are generated by at least one of (i) selecting text from a file that includes content for the presentation or typing the text that includes a cue word or phrase, and automatically converting the text to speech, using a text-to-speech engine implemented by a processor, or (ii) recording the audio files, using a microphone coupled to the computing device, by speaking the at least one cue word or phrase. At step 704, an audio file from the sequence of audio files is triggered. The audio file is triggered by at least one of (i) pressing a button coupled to the computing device or through a personal video device, (ii) analyzing a live speech by a presenter and detecting a pause. (iii) converting the speech to text, using automatic voice recognition, and parsing the text to detect a cue word or pattern, (iv) detecting a slide, a page, or a content in a presentation file, and determining at least one cue that corresponds to the slide, the page, or the content, or (v) detecting a gesture made by the presenter using a camera and a gesture recognition engine. At step 706, the sequence of audio files are played one by one, on the computing device, using the personal audio device coupled to a computing device to enable the presenter to recall and speak the content based on the sequence of the audio files.

The analysis of the live speech by the presenter and detection of the pause includes determination of, whether a duration of a non-speech segment exceeds a threshold pause duration value. The non-speech segment is detected when an energy value of each band in an audio segment is less than a threshold energy value.

At least one approximate time window is determined for the triggering the playing of the audio file from the sequence of audio files by applying a pause detection algorithm to a time interval that includes a time period of a start and an end of a corresponding text segment in a previous recording of the presentation. A triggering gesture is recognised using a camera and a triggering gesture recognition algorithm is applied to an image or video captured by the camera. At least one of (i) playing an audio cue, (ii) rewinding or forwarding by skipping at least one previous or next audio cue, or (iii) changing a presentation slide, or (iv) rewinding or forwarding are triggered by skipping at least one previous or next presentation slide if the triggering gesture is recognized. A body language cue that indicates a body language gesture to be used by the presenter is played and that is selected from a body language gesture database. The body language cue is selected from at least one of a (i) body language audio cue that is played using the personal audio device coupled to the computing device, or a (ii) body language visual cue that is displayed on at least one of the personal video viewing device worn by the presenter or a display device. At least one image or a video of the presenter is recorded using the camera that is coupled to the computing device. At least one body language gesture is extracted from the at least one image or a video of the presenter. A body language score is determined based on a comparison between the at least one body language gesture and a body language gesture database. The speech of the presenter is recorded using a microphone that is coupled to the computing device. The text that is obtained by converting the speech to text is compared using automatic voice recognition with a predefined presentation content to determine a content coverage score. A presentation impact score is determined based on at least the content coverage score and the body language score.

A predefined presentation content is divided into a plurality of text segments. Each of the plurality of text segments is parsed to extract at least one potential cue word in each text segment using natural language processing. The potential cue words are extracted based on at least one uncommon word or phrase or key concept in the text segment. The potential extracted cue words or phrases to the presenter are automatically suggested and a selection or an input of cue words or phrases from the presenter is processed. A machine learning model is trained to automatically suggest more relevant audio cue that are personalized to the presenter based on the selection or the input of the cue words or phrases from the presenter and acceptance or rejection, by the presenter, of cues that are suggested using natural language processing. The text that is obtained by converting the speech to text in real time is compared using automatic voice recognition, with a predefined presentation content to determine a slide number that corresponds to a current speech of the presenter. A slide change in a presentation file associated with the predefined presentation content in the computing device is automatically triggered based on the speech in real time. A first presentation slide is associated with a first light setting with a focus of light on the presenter.

A second presentation slide is associated with a second light setting with a focus on light on the second presentation slide displayed on a screen. The first light setting with the focus of light on the presenter is automatically triggered by transmitting a first command to a smart lighting unit when the first presentation slide is displayed. The second light setting with the focus of light on the second presentation slide is automatically triggered by transmitting a second command to the smart lighting unit when the second presentation slide is displayed. The presenter may be monitored for his response to environmental triggers. e.g. content being delivered at the time stamp of the change in physiological state or a question being posed from the audience during the presentation, or any other interruption during the presentation. In addition, the presenter may be cued for actions in certain scenarios. e.g. forgetting a point in speaking etc. Also, a likely response may be suggested in real time to the question asked from the audience. An input may be prompted to determine a type of the program the subject presenter may need to prepare. Based on that the presenter may undergo mock presentations, virtual reality-based practice programs, programs, remote device assisted programs etc.

In an exemplary embodiment, the method includes a step of obtaining the speaking content for 8 minutes in text and/or voice recording. Speaking content may be text-only which can be converted to voice or voice-only which can be converted to text. At a next step, the speaking content is divided into 24 text segments of 20 seconds each, for example. Each text segment can be recorded separately, or the presentation data analysis server 208 may automatically generate text segments of text and corresponding audio when provided with one single audio file. Each text segment voice recording can be made with desired voice intonation. In some embodiments, the presentation data analysis server 208 may automatically generate multiple permutations and combinations of stressing on different words, and the presenter may select the best fit.

The presenter or a coach/consultant at the remote device may provide text and audio recording cues for each text segment and optionally specify at least one body language gesture for each text segment. Body language gestures can be stored as video recordings of the user making the gestures, or they can be automatically generated simulations of virtual representations e.g., animations that demonstrate the body language gestures. The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output (I/O) devices (including but not limited to predetermined boards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet cards are just a few of the currently available types of network adapters.

Figure 8:
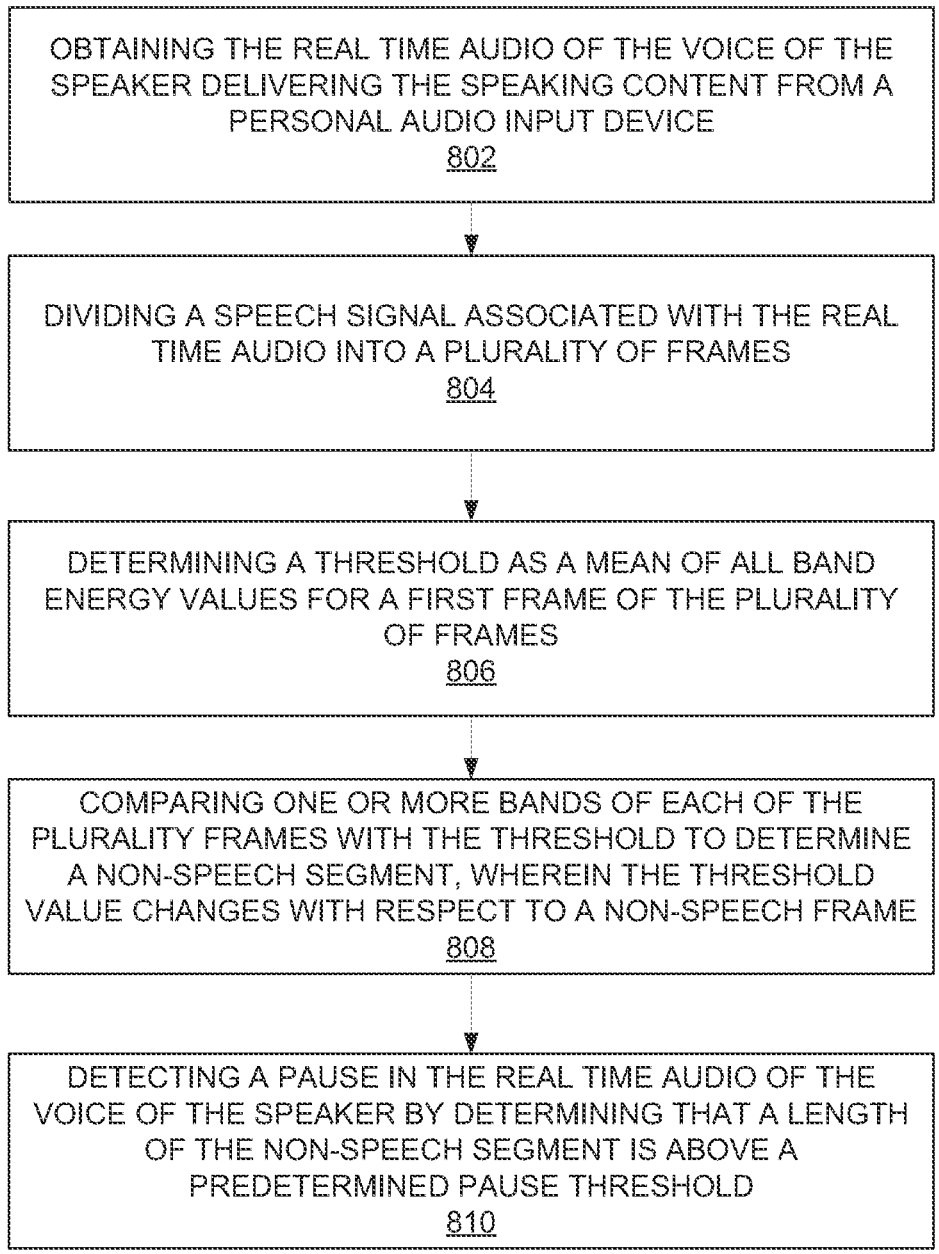
FIG. 8 illustrates a process flow of a method for detecting a pause in a real time audio of a voice of a presenter in accordance with the embodiments herein.

FIG. 8 illustrates a process flow of a method detecting a pause in the real time audio of the voice of the presenter in accordance with the embodiments herein. At step 802, the real time audio of the voice of the presenter delivering the speaking content is obtained from a personal audio device. At step 804, a speech signal associated with the real time audio is divided into a plurality of frames. A first time period as a hamming window may be selected with a second time period as an overlap, and a sample log-spectral energy values may be computed for each time window. Calculation and the adaptation of the threshold, in order to preventing fluctuations in a value of the threshold may arise from either a random noise or long-term silent segments. At step 806, a threshold is determined as a mean of all band energy values for a first frame of the plurality of frames. The threshold may be determined by following equation "Tk(n)=Nk+ [1−N(k, max)/N (k,min(p))]· S(k,u)" where Tk is a threshold value computed for kth band and nth frame, N(k) is a mean of a noise energy computed on recently detected pauses, S(k,u) is a mean value of long-term speech energy computed from the real time audio, N(k,max) and N(k,min(p)) are, respectively, maximum noise energy value from recently detected pauses and minimum noise energy value in current detected silent pause p. At step 808, one or more bands of each of the plurality frames are compared with the threshold to determine a non-speech segment, wherein the threshold value changes with respect to a non-speech frame. At step 810, a pause in the real time audio of the voice of the presenter is detected by determining that a length of the non-speech segment is above a predetermined pause threshold.

In some embodiments, the threshold also includes a correction factor which is described by the equation "Tk(n)=λNk+ (γ/4)*(1−Fc (n))" where Fc is threshold correction obtained from a spectral flatness function which is described as "Fc=N−1Σi=0 log(|S(i,n)|)−log ((N−1)Σ(i=0)(|S(i,n)|))" where λ is a constant signal to noise ratio (SNR) correction and is estimated only once during a first detected non-speech segment. The SNR is computed as the ratio of the average speech energy to the noise energy in the first detected silent pause and reflects energy variations in the speaker's voice and in the environment; S(i, n) is a spectral energy in each frequency band i of the FFT with size N and time window n; γ is a constant taking on two different values, γ T s=1 when the method is processing speech frames and γ T p=1.6 otherwise. The output of this is a vector of 4 binary thresholded values. Such output is then processed by a mapping algorithm indicating if the frame under examination is a speech or a silent segment. A backward analysis is performed after a new silent pause is detected to avoid including in the energy and slope vector computation acoustic features of speech segments (such as weak fricatives and/or reduced vowels) whose energy may fall below the threshold that is defined for the silent intervals.

FIG. 9 illustrates a representative hardware environment for practicing the embodiments herein. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a subject interface adapter 19 that connects predetermined board 15, mouse 17, presenter 24, microphone 22, and/or other subject interface devices such as a personal video device (not shown) or a remote control to the bus 12 to gather subject input. Additionally, a communication adapter 20 connects the bus 12 to a data processing network 25, and a display adapter 21 connects the bus 12 to a display device 23 which may be embodied as an output device such as a monitor, printer, or transmitter, for example. The method and system help the presenters to prepare speaking content for their speech effectively. The presenter is enabled to deliver the content with minimum preparation time and deliver the desired impact. The real time audio cueing makes it easy for the presenter to cover the desired information efficiently without wasting time and attention of listeners. The real time audio cueing is perfected using a machine learning model to determine the audio cueing time and placements effectively.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

I claim:

1. A processor implemented method for generating, triggering and playing, using a personal audio device coupled to a computing device, a sequence of audio files with cues for delivering a presentation for a presenter, wherein the method comprises:

generating a sequence of audio files with cues for delivering a presentation by at least one of (i) selecting text from a file that includes content for the presentation or typing the text that includes a cue word or phrase, dividing the selected text into a plurality of text segments, and automatically converting the text to speech, using a text-to-speech engine implemented by a processor, or (ii) recording the audio files, using a microphone coupled to the computing device, by speaking the at least one cue word or phrase;

parsing each of the plurality of text segments to extract at least one potential cue word in each text segment using natural language processing, wherein the potential cue words are extracted based on at least one uncommon word or phrase or key concept in the text segment;

automatically suggesting potential extracted cue words or phrases to the presenter by processing a selection or an input of cue words or phrases from the presenter;

training a machine learning model to automatically suggest more relevant audio cue words or phrases that are personalized to the presenter based on the selection or the input of the cue words or phrases from the presenter and acceptance or rejection by the presenter of cues that are suggested using natural language processing;

triggering playing an audio file from the sequence of audio files, by at least one of (i) pressing a button coupled to the computing device or through a personal video device, (ii) analysing a live speech by a presenter and detecting a pause, (iii) converting the live speech to text, using automatic voice recognition, and parsing the text to detect a cue word or pattern, (iv) detecting a slide, a page, a bullet point, or a content in a presentation file, and determining at least one cue that corresponds to the slide, the page, the bullet point, or the content, or (v) detecting a gesture made by the presenter using a camera and a gesture recognition engine; and playing the sequence of audio files one by one, on the computing device, using the personal audio device coupled to the computing device to enable the presenter to recall and speak the content based on the sequence of the audio files.

2. The processor implemented method of claim 1, wherein the analysing the live speech by the presenter and detecting the pause comprises determining if a duration of a non-speech segment exceeds a threshold pause duration value, wherein the non-speech segment is detected when an energy value of each band in an audio segment is less than a threshold energy value.

3. The processor implemented method of claim 1, wherein the method comprises determining at least one approximate time window for the triggering the playing of the audio file from the sequence of audio files by applying a pause detection algorithm to a time interval that includes a time period of a start and an end of a corresponding text segment in a previous recording of the presentation.

4. The processor implemented method of claim 1, wherein the method comprises
recognizing a triggering gesture using the camera and a triggering gesture recognition algorithm applied to an image or video captured by the camera; and
triggering at least one of (i) playing an audio cue, (ii) rewinding or forwarding by skipping at least one previous or next audio cue, or (iii) changing a presentation slide, or (iv) rewinding or forwarding by skipping at least one previous or next presentation slide if the triggering gesture is recognized.

5. The processor implemented method of claim 1, wherein the method comprises playing a body language cue that indicates a body language gesture to be used by the presenter, that is selected from a body language gesture database, wherein the body language cue is selected from at least one of a (i) body language audio cue that is played using the personal audio device coupled to the computing device, or a (ii) body language visual cue that is displayed on at least one of a personal video viewing device worn by the presenter or a display device.

6. The processor implemented method of claim 1, wherein the method comprises
comparing the text that is obtained by converting the speech to text in real time, using automatic voice recognition, with a predefined presentation content to determine a slide number that corresponds to a current speech of the presenter; and
automatically triggering a slide change in the presentation file associated with the predefined presentation content in the computing device based on the speech in real time.

7. The processor implemented method of claim 1, wherein the method comprises
associating a first presentation slide with a first light setting with a focus of light on the presenter;
associating a second presentation slide with a second light setting with a focus on light on the second presentation slide displayed on a screen;
automatically triggering the first light setting with the focus of light on the presenter by transmitting a first command to a smart lighting unit when the first presentation slide is displayed; and
automatically triggering the second light setting with the focus of light on the second presentation slide by transmitting a second command to the smart lighting unit when the second presentation slide is displayed.

8. The processor implemented method of claim 1, wherein the method comprises
recording at least one image or a video of the presenter using the camera that is coupled to the computing device;
extracting at least one body language gesture from the at least one image or a video of the presenter; and
determining a body language score based on a comparison between the at least one body language gesture and a body language gesture database.

9. The processor implemented method of claim 1, wherein the method comprises
recording the speech of the presenter using a microphone that is coupled to the computing device;
comparing the text that is obtained by converting the speech to text, using automatic voice recognition with a predefined presentation content to determine a content coverage score; and
determining a presentation impact score based on at least the content coverage score and the body language score, to evaluate the presentation presented by the presenter.

10. A system comprising a computing device coupled to a presentation data analysis server through a network for generating, triggering and playing, using a personal audio device coupled to the computing device, a sequence of audio files with cues for delivering a presentation for a presenter, said computing device comprising: a processor; and a memory that stores a set of instructions, which when executed by the processor, causes it to perform:
generating a sequence of audio files with cues for delivering a presentation by at least one of (i) selecting text from a file that includes content for the presentation or typing the text that includes a cue word or phrase, dividing the selected text into a plurality of text segments, and automatically converting the text to speech, using a text-to-speech engine implemented by a processor, or (ii) recording the audio files, using a microphone coupled to the computing device, by speaking the at least one cue word or phrase;

parsing each of the plurality of text segments to extract at least one potential cue word in each text segment using natural language processing, wherein the potential cue words are extracted based on at least one uncommon word or phrase or key concept in the text segment;

automatically suggesting potential extracted cue words or phrases to the presenter by processing a selection or an input of cue words or phrases from the presenter;

training a machine learning model to automatically suggest more relevant audio cue words or phrases that are personalized to the presenter based on the selection or the input of the cue words or phrases from the presenter and acceptance or rejection by the presenter of cues that are suggested using natural language processing;

triggering playing an audio file from the sequence of audio files, by at least one of (i) pressing a button coupled to the computing device or through a personal video device, (ii) analysing a live speech by a presenter and detecting a pause, (iii) converting the live speech to text, using automatic voice recognition, and parsing the text to detect a cue word or pattern, (iv) detecting a slide, a page, a bullet point, or a content in a presentation file, and determining at least one cue that corresponds to the slide, the page, the bullet point, or the content, or (v) detecting a gesture made by the presenter using a camera and a gesture recognition engine; and playing the sequence of audio files one by one, on the computing device, using the personal audio device coupled to the computing device to enable the presenter to recall and speak the content based on the sequence of the audio files.

11. The system of claim 10, wherein the processor analyses the live speech by the presenter and detects the pause by determining if a duration of a non-speech segment exceeds a threshold pause duration value, wherein the non-speech segment is detected when an energy value of each band in an audio segment is less than a threshold energy value.

12. The system of claim 10, wherein the processor executes the set of instructions to play a body language cue that indicates a body language gesture to be used by the presenter, that is selected from a body language gesture database, wherein the body language cue is selected from at least one of a (i) body language audio cue that is played using the personal audio device coupled to the computing device, or a (ii) body language visual cue that is displayed on at least one of a personal video viewing device worn by the presenter or a display device.

13. The system of claim 10, wherein the processor executes the set of instructions to record at least one image or a video of the presenter using the camera that is coupled to the computing device;

extract at least one body language gesture from the at least one image or a video of the presenter;

determine a body language score based on a comparison between the at least one body language gesture and a body language gesture database;

record the speech of the presenter using a microphone that is coupled to the computing device;

compare the text that is obtained by converting the speech to text, using automatic voice recognition with a predefined presentation content to determine a content coverage score; and determine a presentation impact score based on at least the content coverage score and the body language score.

14. The system of claim 10, wherein the processor executes the set of instructions to compare the text that is obtained by converting the speech to text in real time, using automatic voice recognition, with a predefined presentation content to determine a slide number that corresponds to a current speech of the presenter; and automatically trigger a slide change in the presentation file associated with the predefined presentation content in the computing device based on the speech in real time.

* * * * *